(12) United States Patent
Kaigawa

(10) Patent No.: US 10,225,419 B2
(45) Date of Patent: Mar. 5, 2019

(54) INFORMATION PROCESSING TERMINAL GENERATING CUSTOM OPERATION DATA CONCERNING OPERATION IDENTIFIED BY SELECTED OPERATION ID

(71) Applicant: BROTHER KOGYO KABUSHIKI KAISHA, Nagoya, Aichi (JP)

(72) Inventor: Shinsuke Kaigawa, Kitanagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/602,300

(22) Filed: May 23, 2017

(65) Prior Publication Data

US 2017/0346969 A1  Nov. 30, 2017

(30) Foreign Application Priority Data

May 31, 2016 (JP) ................................ 2016-108753

(51) Int. Cl.
  *H04N 1/00* (2006.01)
(52) U.S. Cl.
  CPC ....... *H04N 1/00503* (2013.01); *H04N 1/0097* (2013.01); *H04N 1/00413* (2013.01); *H04N 1/00416* (2013.01); *H04N 1/00432* (2013.01); *H04N 1/00472* (2013.01); *H04N 1/00474* (2013.01); *H04N 1/00482* (2013.01); *H04N 1/00506* (2013.01); *H04N 1/00509* (2013.01); *H04N 2201/0094* (2013.01)
(58) Field of Classification Search
  CPC combination set(s) only.
  See application file for complete search history.

(56) References Cited

U.S. PATENT DOCUMENTS

| | | | |
|---|---|---|---|
| 2012/0144329 A1* | 6/2012 | Sasaki | G06F 3/0482 715/764 |
| 2015/0317542 A1 | 11/2015 | Sato | |
| 2017/0331967 A1* | 11/2017 | Koike | H04N 1/00511 |

FOREIGN PATENT DOCUMENTS

| | | |
|---|---|---|
| EP | 1 874 027 A1 | 1/2008 |
| EP | 2 993 882 A2 | 3/2016 |
| JP | 2011-154474 A | 8/2011 |

OTHER PUBLICATIONS

Extended European Search Report dated Nov. 3, 2017 from related EP 17172528.6.

* cited by examiner

*Primary Examiner* — Helen Zong
(74) *Attorney, Agent, or Firm* — Scully, Scott, Murphy & Presser, PC

(57) ABSTRACT

An information processing terminal acquires a plurality of object IDs identifying respective ones of a plurality of display objects. Each of the plurality of display objects is previously with a corresponding standard operation. The terminal acquires a plurality of operation IDs identifying respective ones of the plurality of operations, and displays a first screen to prompt a user to select an operation ID to be correlated to one of the plurality of object IDs. The terminal receives a first input to select an operation ID to be correlated to an object ID via the user interface after the first screen is displayed on the terminal display. The terminal generates instruction data and custom operation data defining a custom operation concerning an operation identified by the selected operation ID. The instruction data is information used for execution of the custom operation defined.

10 Claims, 14 Drawing Sheets

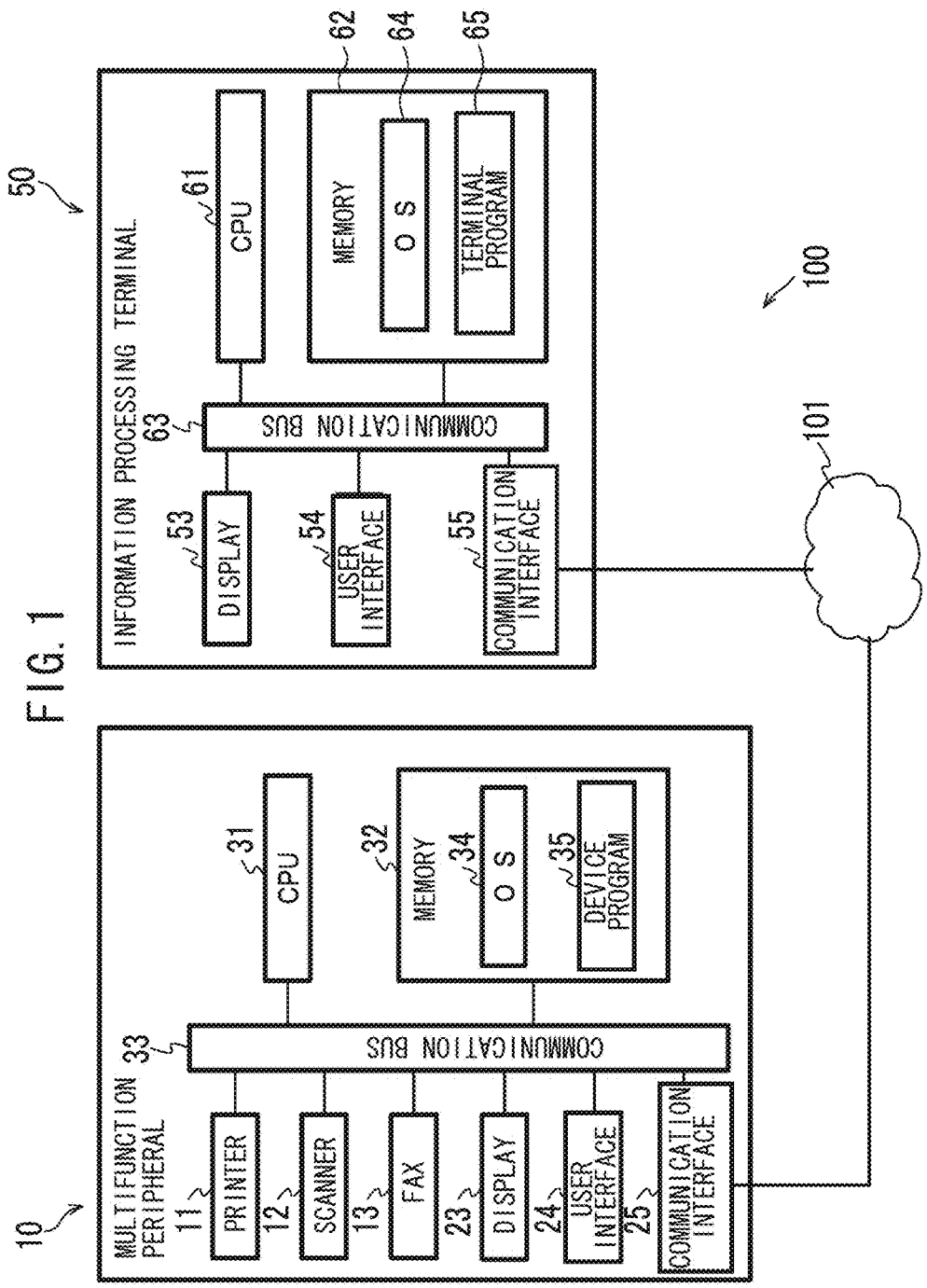

FIG. 2(A)

<STANDARD SCREEN DATA>

```
<ScreenSetting>
    <DisplayID>001</DisplayID>
    <DisplayName>STANDARD SCREEN</DisplayName>

<Icon>
      <IconID>001</IconID>
      <IconImage>
        <Normal>//standard/standard_icon01_normal.jpeg</Normal>
        <Pushed>//standard/standard_icon01_pushed.jpeg</Pushed>
      </IconImage>
      <IconText> SCAN </IconText>
      <FunctionID>001</FunctionID>
    </Icon>

<Icon>
      <IconID>002</IconID>
      <IconImage>
        <Normal>//standard/standard_icon02_normal.jpeg</Normal>
        <Pushed>//standard/standard_icon02_pushed.jpeg</Pushed>
      </IconImage>
      <IconText> COPY </IconText>
      <FunctionID>002</FunctionID>
    </Icon>

<Icon>
      <IconID>003</IconID>
      <IconImage>
        <Normal>//standard/standard_icon03_normal.jpeg</Normal>
        <Pushed>//standard/standard_icon03_pushed.jpeg</Pushed>
      </IconImage>
      <IconText>FAX</IconText>
      <FunctionID>003</FunctionID>
    </Icon>
</ScreenSetting>
```

FIG. 2(B)

<STANDARD OPERATION DATA>

```
<Standard Function>
    <FunctionID>001<FunctionID>
    <Scan>
       <Resolution>300</Resolution>
       <FileType>PDF</FileType>
    </Scan>
</Standard Function>
```

FIG. 3(A)

| OPERATION ID | OPERATION PARAMETERS | OPERATION NAME |
|---|---|---|
| Copy | RESOLUTION "600dpi"<br>SIZE "A4"<br>COLOR "MONOCHROME" | MONO-COPY |
| Scan to FTP | RESOLUTION "300dpi"<br>FORMAT "PDF"<br>SERVER ID "www.server-a.com" | SCAN TO SERVER |

FIG. 3(B)

<CUSTOM SCREEN DATA>

```
<ScreenSetting>
    <DisplayID>001</DisplayID>
    <DisplayName> OPERATION SELECTION SCREEN </DisplayName>
    <BGImage>//custom/bgimage01.jpeg</BGImage>

<Icon>
      <IconID>001</IconID>
      <IconImage>
        <Normal>//custom/icon01_normal.jpeg</Normal>
        <Pushed>//custom/icon01_pushed.jpeg</Pushed>
      </IconImage>
      <IconText>  SCAN → SERVER C  </IconText>
      <ViewState>1</ViewState>
      <ChangePosX>+10</ChangePosX>
      <ChangePosY>+10</ChangePosY>
      <FunctionID>001</FunctionID>
    </Icon>

<Icon>
      <IconID>002</IconID>
      <ViewState>0</ViewState>
      <FunctionID>002</FunctionID>
    </Icon>

<Icon>
      <IconID>003</IconID>
      <IconImage>
        <Normal>//custom/icon03_normal.jpeg</Normal>
        <Pushed>//custom/icon03_pushed.jpeg</Pushed>
      </IconImage>
      <IconText>MONOCHROME COPY</IconText>
      <ViewState>1</ViewState>
      <ChangePosX>-10</ChangePosX>
      <ChangePosY>-10</ChangePosY>
      <FunctionID>003</FunctionID>
    </Icon>

</ScreenSetting>
```

FIG. 4 (A)
<CUSTOM OPERATION DATA>

```
<Customize Function>
    <FunctionID>901<FunctionID>
    <Scan to FTP>
        <Resolution>300</Resolution>
        <File Type>PDF</FileType>
        <DestinationID>www.server-a.com</DestinationID>
    </Scan to FTP>
</Customize Function>
```

FIG. 4 (B)
<CUSTOM OPERATION DATA>

```
<Customize Function>
    <FunctionID>903<FunctionID>
    <Copy>
        <Resolution>600</Resolution>
        <Document Size>A4<Document Size>
        <Color>mono</Color>
    </Copy>
</Customize Function>
```

FIG. 4 (C)
<INSTRUCTION SCRIPT>

```
function convert_appui(in_funcID)
  local out_funcID if in_funcID == 001 then
    out_funcID = 901
  else if in_funcID == 003 then
    out_funcID = 903
  else
    out_funcID = in_funcID
  end return out_funcID
end
```

FIG. 8

| Icon | | Text | Xpos | Ypos | Function | |
|---|---|---|---|---|---|---|
| Show | Image | | | | | |
| ✓ | 🖥️ | SCAN | 0 | 0 | Scan | ▶ |
| ✓ | 📄 | COPY | 0 | 0 | Copy | ▶ |
| ✓ | 📠 | FAX | 0 | 0 | FAX | ▶ |

CUSTOM CONFIGURATION SCREEN

Background

REGISTER

GENERATE

INFORMATION PROCESSING TERMINAL GENERATING CUSTOM OPERATION DATA CONCERNING OPERATION IDENTIFIED BY SELECTED OPERATION ID

CROSS REFERENCE TO RELATED APPLICATION

This application claims priority from Japanese Patent Application No. 2016-108753 filed May 31, 2016. The entire content of the priority application is incorporated herein by reference.

TECHNICAL FIELD

The present disclosure relates to a technique for an information processing terminal that customizes a user interface for an image-forming apparatus.

BACKGROUND

For example, Japanese Patent Application Publication No. 2011-154474 describes a program executed on an information processing terminal to customize the screen displayed on a printer display. More specifically, this program receives UI information from the printer. The UI information defines what is displayed in the screen and how. The program prompts the user to revise the UI information and transmits the revised UI information to the printer.

SUMMARY

However, the program described in the above document is limited to modifying the appearance of the screen displayed on the printer display by determining which UI elements are shown or hidden and modifying their displayed positions, for example.

In view of the foregoing, it is an object of the present disclosure to provide a technique concerning an information processing terminal that can more flexibly customize the user interface for an image-forming apparatus.

In order to attain the above and other objects, the disclosure provides a non-transitory computer readable storage medium storing a set of instructions installed on and executed by an information processing terminal having a terminal display and a user interface. The set of instructions includes: acquiring a plurality of object IDs identifying respective ones of a plurality of display objects, the plurality of display objects being to be displayed at respective designated positions on an apparatus display of an image forming apparatus, each of the plurality of object IDs being previously assigned with a corresponding standard operation concerning one of a plurality of operations which the image forming apparatus is capable of execute; acquiring a plurality of operation IDs identifying respective ones of the plurality of operations; receiving a first input indicating an operation ID to be correlated to an object ID from among the plurality of operation IDs via the user interface; generating instruction data and custom operation data, the custom operation data defining a custom operation concerning an operation identified by the indicated operation ID, the instruction data being information used for execution of the custom operation defined by the custom operation data in response to designation of a display object identified by the correlated object ID; and outputting the generated custom operation data and the generated instruction data.

According to another aspects, the disclosure provides a system. The system includes: an information processing terminal having a terminal display, a first user interface, and a first control device; and an image forming apparatus having an apparatus display, a second user interface, a communication interface, and a second control device. The first control device is configured to: acquire a plurality of object IDs identifying respective ones of a plurality of display objects, the plurality of display objects being to be displayed at respective designated positions on the apparatus display of an image forming apparatus, each of the plurality of object IDs being previously assigned with a corresponding standard operation concerning one of a plurality of operations which the image forming apparatus is capable of execute; acquire a plurality of operation IDs identifying respective ones of the plurality of operations; receive a first user input indicating an operation ID to be correlated to an object ID from among the plurality of operation IDs via the user interface; generate instruction data and custom operation data, the custom operation data defining a custom operation concerning an operation identified by the indicated operation ID, the instruction data being information used for execution of the custom operation defined by the custom operation data in response to designation of a display object identified by the correlated object ID; and output the generated custom operation data and the generated instruction data to the image forming apparatus. The second control device is configured to: receive the custom operation data and the instruction data from the information processing terminal via the communication interface; display the display object identified by the correlated object ID at the designated position of the apparatus display; receive a second input indicating to select the display object displayed on the apparatus display via the second user interface; execute the custom operation defined by the custom operation data concerning the operation identified by the selected operation ID in response to reception of the second input.

BRIEF DESCRIPTION OF THE DRAWINGS

The particular features and advantages of the disclosure as well as other objects will become apparent from the following description taken in connection with the accompanying drawings, in which:

FIG. 1 is a block diagram illustrating a system including a multifunction peripheral and an information processing terminal according to an embodiment;

FIG. 2(A) is an explanatory diagram illustrating an example of standard screen data stored in a memory of the multifunction peripheral;

FIG. 2(B) is an explanatory diagram illustrating an example of standard operation data stored in the memory of the multifunction peripheral;

FIG. 3(A) is an explanatory diagram illustrating an example of an operation information list generated by a terminal program in the information processing terminal;

FIG. 3(B) is an explanatory diagram illustrating an example of custom screen data generated by the terminal program;

FIG. 4(A) is an explanatory diagram illustrating an example of custom operation data generated by the terminal program;

FIG. 4(B) is an explanatory diagram illustrating another example of custom operation data generated by the terminal program;

FIG. 4(C) is an explanatory diagram illustrating an example of an instruction script generated by the terminal program;

FIG. 8 is an explanatory diagram illustrating an example of a custom configuration screen in which an [Icon] tab is selected;

DETAILED DESCRIPTION

Figure 5A:
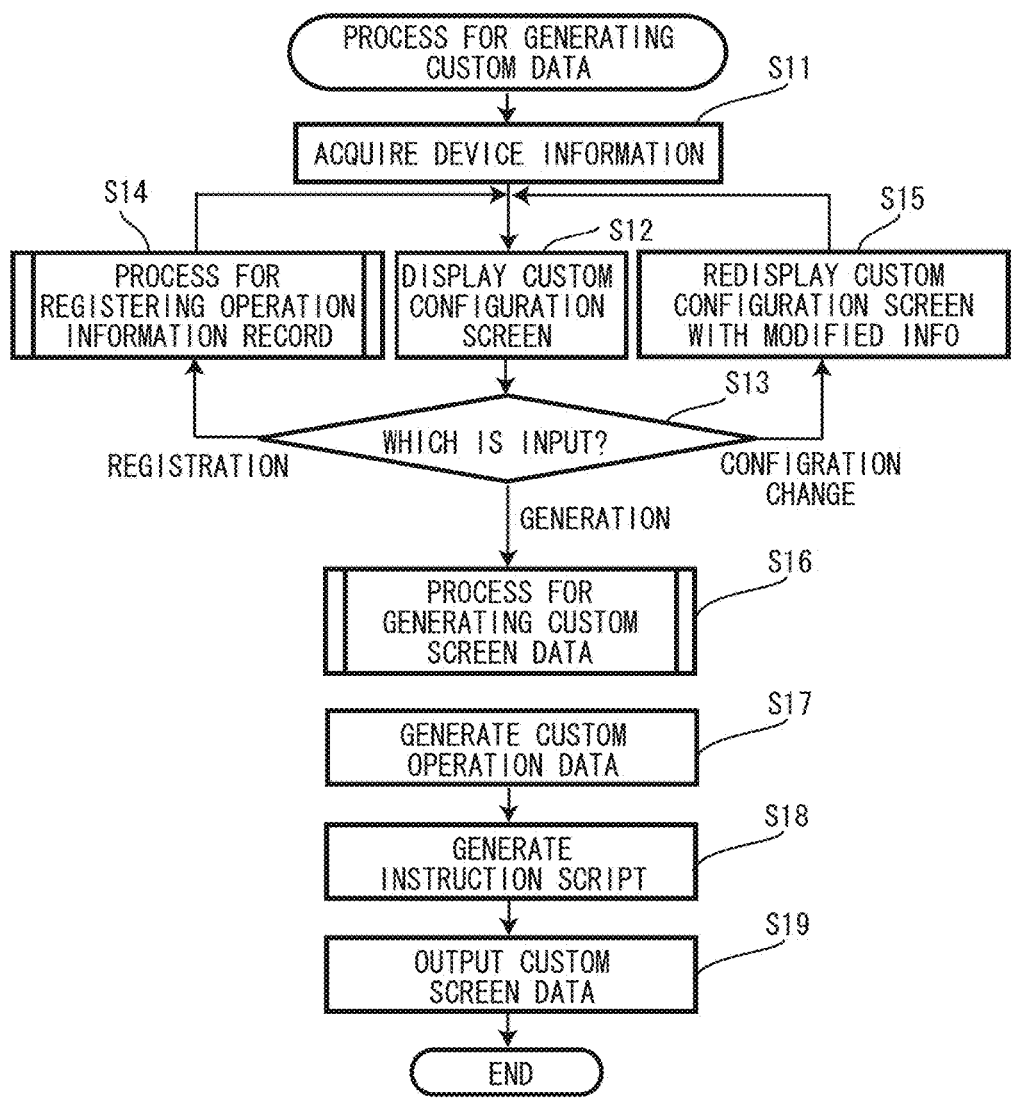
FIG. 5(A) is a flowchart illustrating a process for generating custom data.

Next, an embodiment of the present disclosure will be described while referring to the accompanying drawings. The embodiment described below is merely an example. As a matter of course, the embodiment of the disclosure can be appropriately modified. For example, the order for executing the processes described below may be appropriately modified.

FIG. 1 is a schematic diagram showing a system 100 according to the embodiment. The system 100 shown in FIG. 1 includes a multifunction peripheral 10, and an information processing terminal 50. The multifunction peripheral 10 and the information processing terminal 50 can communicate with each other over a communication network 101. While there are no particular limitations on the configuration of the communication network 101, the communication network 101 may be the Internet, a wired LAN, a wireless LAN, or any combination of these. Alternatively, the multifunction peripheral 10 and the information processing terminal 50 may be connected with a USB cable or the like. The system 100 may include a plurality of multifunction peripherals 10 which can communicate with the information processing terminal 50.

As shown in FIG. 1, the multifunction peripheral 10 primarily includes a printer 11, a scanner 12, a fax 13, a display 23, a user interface 24, a communication interface 25, a CPU 31, a memory 32, and a communication bus 33. The components configuring the multifunction peripheral 10 are interconnected via the communication bus 33. The multifunction peripheral 10 is an example of the image-forming apparatus. Each component of the multifunction peripheral 10 is an example of an operational part that implements operations described later.

The printer 11 executes a print operation for recording an image specified by image data on a sheet. The method of recording employed by the printer 11 may be any well-known method including an inkjet method or an electrophotographic method. The scanner 12 executes a scan operation for reading an image recorded on an original in order to generate scan data. The fax 13 executes a fax operation for transmitting image data by fax to external apparatuses and receiving image data by fax from external apparatuses.

The display 23 includes a display screen for displaying various information. The display 23 may be configured of an LCD or an organic EL display, for example. The display 23 is an example of the device display.

The user interface 24 is a user interface for accepting input operations performed by the user. Specifically, the user interface 24 has buttons and outputs various operation signals to the CPU 31 corresponding to buttons that have been pressed. The user interface 24 may also have a film-like touchscreen laid over the surface of the display 23. Examples of inputs include operations for specifying objects displayed on the display 23, and operations for inputting alphabetic and numeric strings. Some examples of "objects" displayed on the display 23 are character strings, icon buttons, links, radio buttons, checkboxes, and pull-down menus. The user interface 24 is an example of the second user interface. In the present disclosure, input indicates an operation by the user via the user interface, that is, the user operation.

The user interface 24 is implemented as a touchscreen, and outputs position information indicating positions on the display screen that the user touched. In general, the term "touch" in this specification includes any operation for contacting the display screen with an input medium. Further, an action called "hover" or "floating touch" in which the input medium is brought to a position only slightly separated from the display screen while not actually touching the same may also fall under the concept of "touch" described above. Further, the input medium may be the user's finger, a stylus pen, or the like. A user action including the user tapping the display 23 at a position corresponding to a displayed object is one example of an input for specifying an object.

The communication interface 25 is an example of an interface for communicating with external apparatuses via the communication network 101. In other words, the multifunction peripheral 10 transmits various data to external apparatuses via the communication interface 25 and receives various data from external apparatuses via the communication interface 25. Hereinafter, an operation implemented by the communication interface 25 to transmit data to an external apparatus will be called an upload operation, while an operation implemented by the communication interface 25 to receive data from an external apparatus will be called a download operation. While there is no particular restriction on the specific communication method used by the communication interface 25, the communication interface 25 may employ Wi-Fi technology (Wi-Fi is a registered trademark), for example. Further, if the multifunction peripheral 10 and the information processing terminal 50 are connected by a USB cable or the like, the communication interface 25 may be implemented by a USB interface to which a USB cable is detachably connected.

The multifunction peripheral 10 can also execute a compound operation having more than one operation. An example of a compound operation is a scan-and-upload operation including a scan operation and an upload operation. In the scan-and-upload operation, the scanner 12 generates scan data in the scan operation, and the communication interface 25 transmits the scan data to an external apparatus in the upload operation. In the scan-and-upload operation, the scanner 12 is an example of the first operational machine, the scan operation is an example of the first operation, the communication interface 25 is an example of the second operational machine, and the upload operation is an example of the second operation.

Another example of a compound operation is a copy operation including a scan operation and a print operation. In the copy operation, the scanner 12 generates scan data in the scan operation, and the printer 11 records an image represented by the scan data on a sheet in the print operation. In the copy operation, the scanner 12 is an example of the first operational machine, the scan operation is an example of the first operation, the printer 11 is an example of the second operational machine, and the print operation is an example of the second operation.

An operation ID is used to identify each operation that the multifunction peripheral 10 can implement. For example, the print operation executed by the printer 11 is identified by the operation ID "Print"; the scan operation executed by the scanner 12 is identified by the operation ID "Scan"; the fax operation executed by the fax 13 is identified by the operation ID "Fax"; the upload operation and download operation executed by the communication interface 25 are respectively identified by the operation IDs "Upload" and "Download"; the copy operation is identified by the operation ID "Copy"; and the scan-and-upload operation is identified by the operation ID "Scan to FTP".

The multifunction peripheral 10 implements operations in accordance with operation parameters. Values of operation parameters are information specifying conditions for implementing the operation. Values of the operation parameters includes a set value for each of one or more parameters (for example, resolution, format, size, color, and server ID). The types of operation parameters differ according to the operation. For example, values of operation parameters for a scan operation may include set values for the resolution and format parameters. Values of operation parameters for a print operation may include set values for the size and color parameters, for example. Values of operation parameters for an upload operation may include a set value for the server ID parameter, for example.

The set value for the resolution parameter specifies the resolution at which an original is read. The set value for the format parameter specifies the file format for the scan data. The set value for the size parameter specifies the size of the sheet on which the image is to be recorded. The set value for the color parameter specifies the colors to be used in the print operation. The setting for the server ID parameter identifies the destination server to which data will be uploaded. Note that the operation parameters for operations need not include all of the above parameters, or may include additional parameters to those described above.

Further, the operation parameters for compound operations include the operation parameters for each of the operations constituting the compound operation. As illustrated in FIG. 3(A), values of the operation parameters for a copy operation include a set value for the resolution parameter, which is the operation parameter for a scan operation; and set values for the size and color parameters, which are the operation parameters for a print operation. Values of operation parameters for a scan-and-upload operation include set values for the resolution and format parameters, which are the operation parameters for a scan operation; and set value for the server ID parameter, which is the operation parameter for an upload operation.

The CPU 31 controls all operations of the multifunction peripheral 10. The CPU 31 acquires various programs described later from the memory 32 and executes the programs based on various information outputted from the user interface 24, various information acquired from external apparatuses via the communication interface 25, and the like. The CPU 31 and the memory 32 constitute an example of the second control device.

The memory 32 stores an OS 34, and a device program 35. The device program 35 may be a single program, or an aggregate of programs. For example, the memory 32 may be configured of RAM, ROM, EEPROM, a hard disk drive, a portable storage medium such as USB memory detachably mounted in the multifunction peripheral 10, a buffer provided in the CPU 31, or a combination of these.

The memory 32 may be any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium. This description also applies to a memory 62 provided in the information processing terminal 50 described later.

The memory 32 stores standard screen data, and a plurality of sets of standard operation data, for example. The manufacturer of the multifunction peripheral 10 stores the standard screen data and the plurality of sets of standard operation data in the memory 32 prior to shipping the multifunction peripheral 10, for example. While not particularly limited to any specific format, the standard screen data and the plurality of sets of standard operation data may be information in the XML format, for example.

Figure 12A:
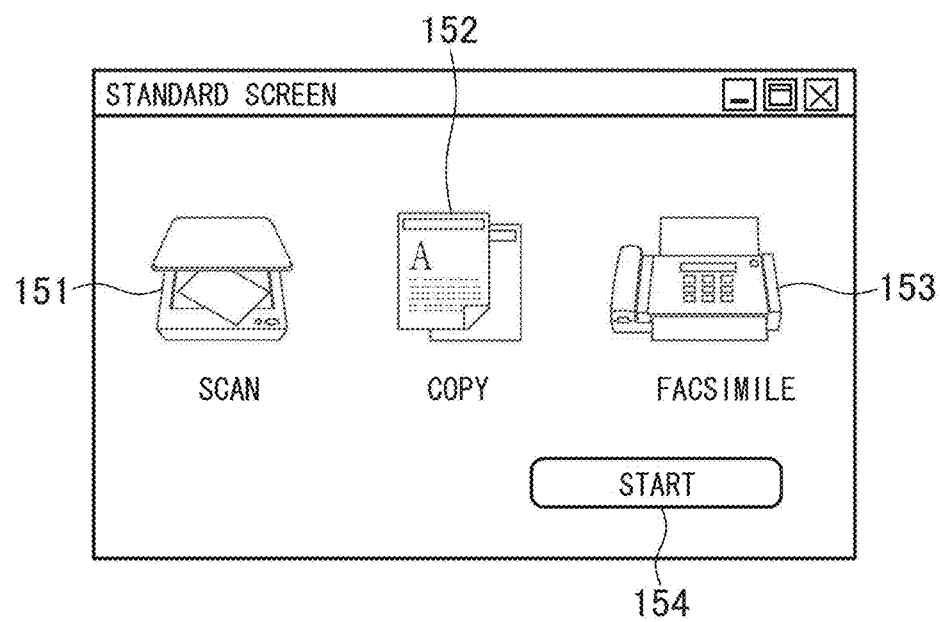
FIG. 12(A) is an explanatory diagram illustrating an example of a standard screen displayed on the display.

The standard screen data is information specifying a standard screen to be displayed on the display 23. FIG. 2(A) shows an example of standard screen data. In this example, the standard screen data includes a display ID as an element with the tag <DisplayID>, a display name as an element with the tag <DisplayName>, a plurality of sets of icon information as a plurality of elements with the tag <Icon>. The display ID "001" identifies one of a plurality of screens to be displayed on the display 23. The display name "Standard screen" is a character string to be displayed in the screen as the title of the display identified by the display ID "001". The plurality of sets of icon information specifies operation icons 151, 152, and 153 to be displayed at specified positions in the screen, as illustrated in FIG. 12(A).

Each set of icon information includes an icon ID as an element with the tag <IconID>, a data ID as an element with the tag <IconImage>, an icon text as an element with the tag <IconText>, and a function ID as an element with the tag <FunctionID>. Each set of icon information corresponds to one of the operation icons 151, 152, and 153. Since the set of icon information corresponding to the operation icons 151, 152, and 153 has a common format, the following description will focus only on icon information for the operation icon 151.

Icon ID "001" is an example of an object ID that identifies the operation icon 151. The data ID "//standard/standard_icon01_normal.jpeg" is an element of the <Normal> tag, and specifying the location of default image data representing the operation icon 151 before the user has selected an image represented as the operation icon 151 via the user interface 24. The data ID "//standard/standard_icon01_pushed.jpeg" is an element of the <Pushed> tag specifying the location of image data that the user has selected via the user interface 24 after the user has selected the image representing the operation icon 151. Here, "selecting an image of an icon via the user interface 24" denotes a tap operation at a position corresponding to an icon, for example. The icon text "Scan" is a character string displayed in association with the operation icon 151. The function ID "001" identifies standard operation data associated with the operation icon 151.

The standard operation data indicates operations that the multifunction peripheral 10 is to execute when one of the operation icons 151, 152, and 153 is selected via the user interface 24. Since the standard operation data for the operation icons 151, 152, and 153 has a common format, the following description will focus on standard operation data associated with the operation icon 151.

FIG. 2(B) shows an example of standard operation data associated with the operation icon 151. In this example, the standard operation data includes a function ID as an element with the tag <FunctionID>, an operation ID specified by the tag <Scan>, and operation parameters and set values thereof as elements with the tag <Scan>. The <FunctionID> element specifies the function ID for the scan operation. The function ID "001" corresponds to the function ID included in the standard screen data. The <Scan> tag denotes the operation ID of a scan operation. The <Scan> element contains two elements having the tags <Resolution> and <File Type>. The <Resolution> element specifies the value "300 dpi" for the resolution parameter. The <File Type> element specifies the value "PDF" for the format parameter.

As shown in FIG. 1, the information processing terminal 50 primarily includes a display 53, an user interface 54, a communication interface 55, a CPU 61, a memory 62, and a communication bus 63. Since the display 53, the user interface 54, the communication interface 55, the CPU 61, the memory 62, and the communication bus 63 of the information processing terminal 50 share the same structure as the display 23, the user interface 24, the communication interface 25, the CPU 31, the memory 32, and the communication bus 33 of the multifunction peripheral 10, a description of these components will not be repeated. The display 53 is an example of the terminal display, the user interface 54 is an example of the first user interface, and the CPU 61 and the memory 62 are an example of the first control device. The information processing terminal 50 may be a mobile phone, a smartphone, a tablet computer, or a personal computer, for example.

The memory 62 stores an OS 64, and a terminal program 65. The memory 62 can also store an operation information list shown in FIG. 3(A). The operation information list includes one or more operation information records. An operation information record is an example of operation information that includes an operation ID, operation parameters and values thereof, and an operation name Operation information records may be registered in the operation information list when the terminal program 65 is installed, for example, or may be registered in the operation information list by the terminal program 65 in a process for registering operation information records described later. While not particularly limited to any format, the operation information list may be information in the XML format, for example.

Each of the operation IDs and a value of each operation parameter are associated with an operation that the multifunction peripheral 10 can implement. Each operation name is information in text format representing the name of the operation identified by the corresponding operation ID. The user of the information processing terminal 50 may set operation names as desired, for example. In the example of FIG. 3(A), the scan-and-upload operation is represented by the text "Scan to Server" as the operation name, while the copy operation is represented by the text "Mono-Copy" as the operation name.

While not shown in the drawings, the memory 62 can also store a designated device ID. The designated device ID identifies a multifunction peripheral 10 that the user has designated from among the plurality of multifunction peripherals 10 that can communicate with the information processing terminal 50 via the communication interface 55. For example, the terminal program 65 displays a plurality of device icons on the display 53. The plurality of device icons respectively corresponds to the plurality of multifunction peripherals 10 that can communicate with the information processing terminal 50 via the communication interface 55. When the user selects a device icon displayed on the display 53 through an operation on the user interface 54, the terminal program 65 sets the multifunction peripheral 10 corresponding to the device icon as the designated device. Next, the terminal program 65 stores the device ID of the designated device in the memory 62 as the designated device ID.

Figure 6:
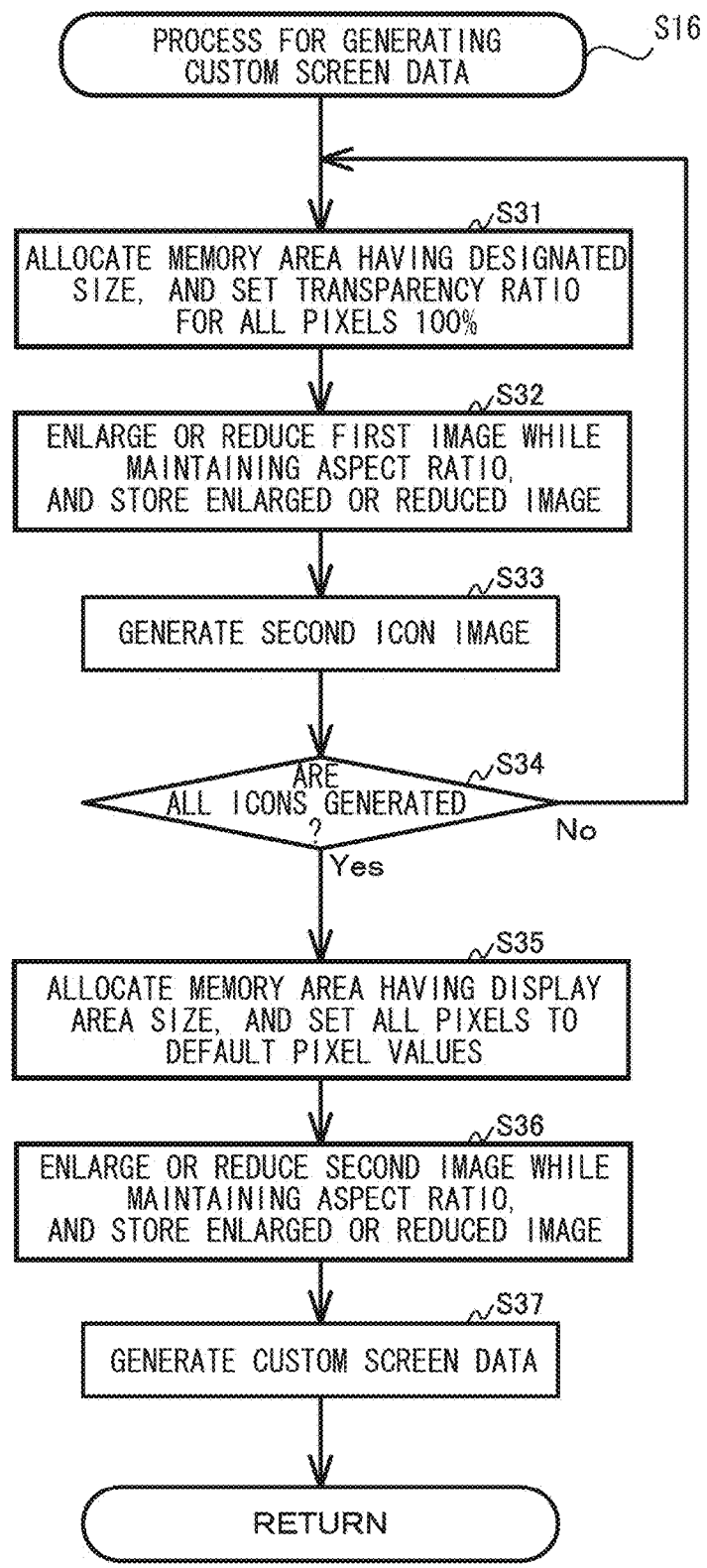
FIG. 6 is a flowchart illustrating a process for generating custom screen data.
Figure 7:
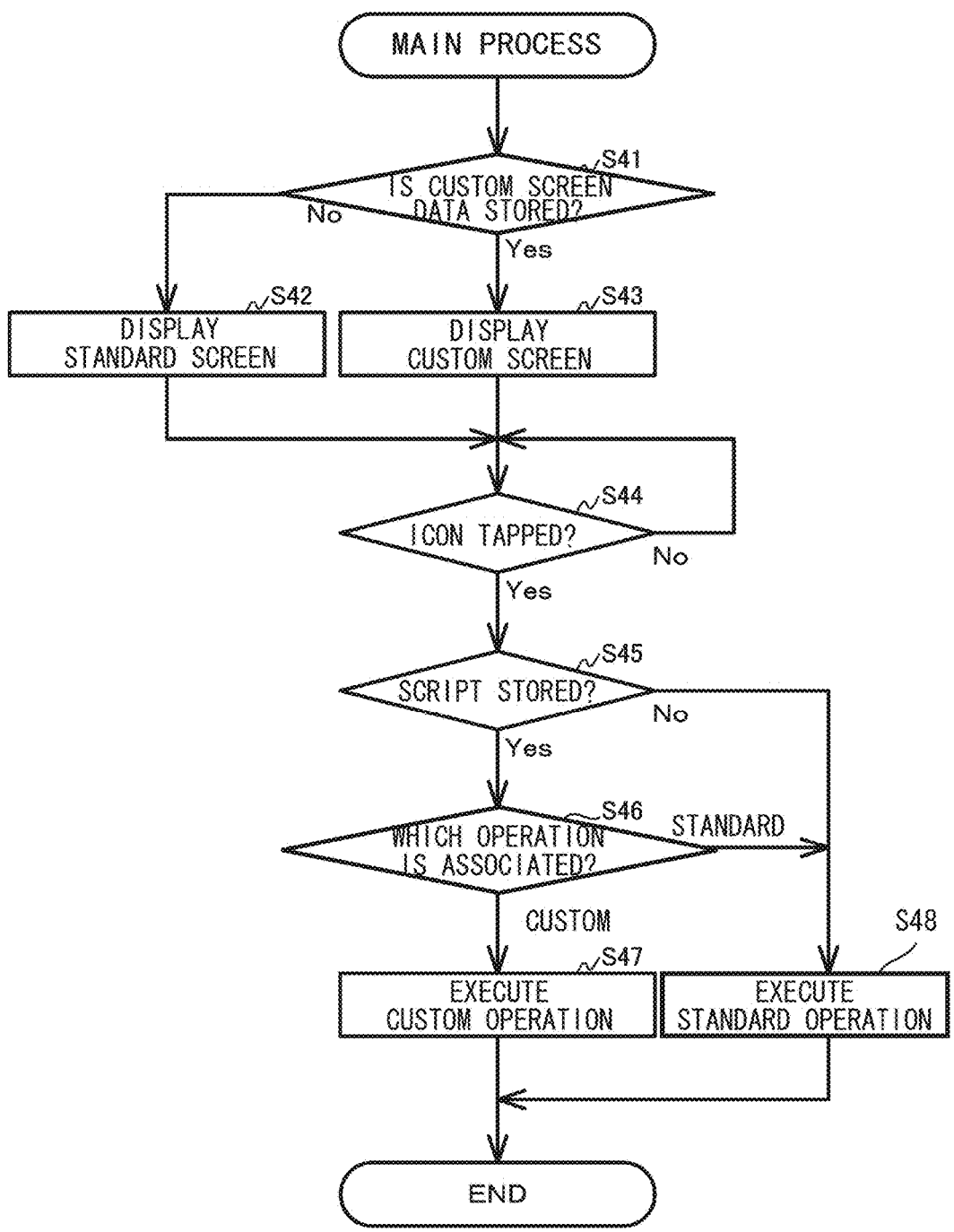
FIG. 7 is a flowchart illustrating a main process.

Next, the operations of the system 100 according to the embodiment will be described with reference to FIG. 5 through 7.

In general, flowcharts in this specification depict steps performed by the CPUs 31 and 61 according to instructions described in programs. In other words, actions such as "determine," "extract," "select," "calculate," "set," "identify," "control," and the like in the following description represent steps performed by the CPU 31 or 61. Steps performed by the CPU 61 include processes that control hardware through the OS 64. Further, "data" in this specification represents bit strings that a computer can read. Further, data of different formats are treated as the same data when the content of the data is essentially the same. The same holds true for "information" in this specification.

Process for Generating Custom Data

The terminal program 65 executes a process for generating custom data in response to start of the terminal program 65 caused by a command issued by the user via the user interface 54, for example. The process for generating custom data generates custom screen data, custom operation data, and an instruction script based on information acquired through user input received via a custom configuration screen described later. Next, the process for generating custom data will be described in detail with reference to FIG. 5(A).

In S11 of FIG. 5(A), the terminal program 65 acquires device information for the designated device. The terminal program 65 may read the device information from the memory 62, for example. Alternatively, the terminal program 65 may receive the device information from the designated device through the communication interface 55. Alternatively, the terminal program 65 may transmit model information specifying the model name of the designated device to a server (not shown) through the communication interface 55. In this case, the server returns device information stored in a memory on the server in association with the model information, and the terminal program 65 subsequently receives the device information from the server via the communication interface 55. The process of S11 is an example of the acquiring process, the first acquiring process, the second acquiring process, and the third acquiring process.

The device information includes standard screen data shown in the example of FIG. 2(A), a plurality of icon IDs, a plurality of operation IDs, and candidate values for operation parameters corresponding respectively to operations specified by the operation IDs. Each icon ID identifies one of a plurality of icons displayed on the display 23 of the designated device. Each operation ID identifies one of the operations that the designated device can implement. The candidate values of the operation parameters are a plurality of candidate values that can be selected for each of a plurality of parameters used in each operation. The device information may also include condition information specifying a first display condition and a second display condition described later. While not particularly limited to any format, the device information may be information in the XML format, for example.

In this example, the device information includes icon IDs "001", "002", and "003". The device information also includes operation IDs "Scan", "Print", "Upload", "Download", "Copy", and "Scan to FTP". For the resolution parameter, the device information includes candidate values "300 dpi" and "600 dpi". For the format parameter, the device information includes candidate values "PDF" and "TIFF". For the size parameter, the device information includes candidate values "A4", "B5", and "L". For the color parameter, the device information includes candidate values "Color" and "Monochrome". For the server ID parameter, the device information includes candidate values "www.server-a.com" and "www.server-b.com".

Figure 9:
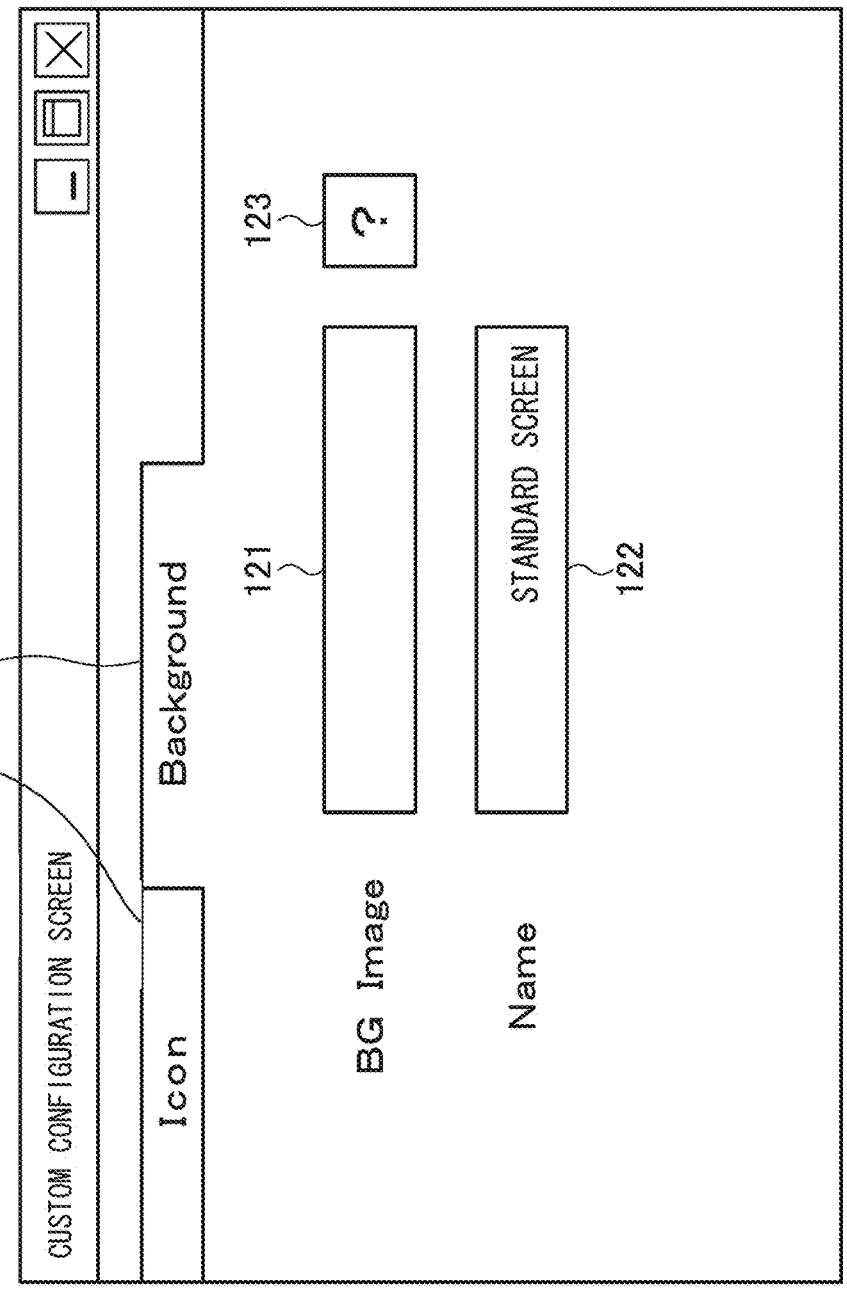
FIG. 9 is an explanatory diagram illustrating an example of a custom configuration screen in which a [Background] tab is selected.

In S12 the terminal program 65 displays the custom configuration screen shown in FIG. 8 or 9 on the display 53. The custom configuration screen is an example of the customization screen or the first screen that allows the user to customize a screen to be displayed on the multifunction peripheral 10. In S13 the terminal program 65 accepts an input in the custom configuration screen via the user interface 54. The process of S12 is an example of the displaying process or the first displaying process, and the process in S13 is an example of the first receiving process.

Specifically, the custom configuration screen allows the user to select an operation ID to be associated with each icon ID acquired in S11 from among the plurality of operation IDs acquired in S11. Further, the custom configuration screen allows the user to select image data to be associated with each icon ID acquired in S11, for example. Further, the custom configuration screen allows the user to specify other information to be displayed on the display 23 of the multifunction peripheral 10.

The custom configuration screen includes an [Icon] tab 110, and a [Background] tab 120. More specifically, in response to a specification for the [Icon] tab 110 received via the user interface 54, the terminal program 65 displays the custom configuration screen acquired in S11 on the display 53 as shown in FIG. 8. This custom configuration screen includes a plurality of objects 111-116 corresponding to the plurality of <Icon> tags in the standard screen data, a [Register] icon 117, and a [Generate] icon 118. The [Register] icon 117 is for starting a process for registering operation information record (FIG. 5(B)). The [Generate] icon 118 is for starting a process for generating custom screen data (FIG. 6). The custom configuration screen shown in FIG. 8 allows the user to customize icons that will be displayed on the display 23 of the multifunction peripheral 10.

In FIG. 8, a checkbox 111A, an image icon 112A, textboxes 113A, 114A, and 115A, and a pull-down menu 116A are objects that enable the user to edit elements of the <Icon> tag that includes the icon ID "001". A checkbox 111B, an image icon 112B, textboxes 113B, 114B, and 115B, and a pull-down menu 116B are objects that enable the user to edit elements of the <Icon> tag that includes the icon ID "002". A checkbox 111C, an image icon 112C, textboxes 113C, 114C, and 115C, and a pull-down menu 116C are objects that enable the user to edit elements of the <Icon> tag that includes the icon ID "003". Since the objects corresponding to each icon ID have common functions, the following description will focus only on objects 111A-116A corresponding to icon ID="001".

The checkbox 111A corresponds to an instruction to show or hide the operation icon 151 on the display 23 of the multifunction peripheral 10. More specifically, a checked checkbox 111A corresponds to an instruction to display the operation icon 151, while an unchecked checkbox 111A corresponds to an instruction to hide the operation icon 151. The checkbox 111A is initially in a checked state.

The image icon 112A corresponds to an instruction to modify image data specifying the operation icon 151. For example, in response to a specification for the image icon 112A received via the user interface 54, the terminal program 65 displays on the display 53 a list stored in the memory 62 or on a server (not shown) on the Internet. Here, the list includes a plurality of options for respective image data. The terminal program 65 receives a selection via the user interface 54 from among the plurality of options displayed in the list. Next, the terminal program 65 displays an image specified by the selected image data as the image icon 112A. The initial image of the image icon 112A is represented by image data designated by the content of the <Normal> element provided in the standard screen data.

The textbox 113A corresponds to an instruction to modify icon text to be displayed in association with the operation icon 151. The terminal program 65 displays a character string inputted in the textbox 113A via the user interface 54. The character string initially displayed in the textbox 113A is "Scan", which is the content of the <IconText> tag provided in the standard screen data.

The textboxes 114A and 115A correspond to instructions for modifying position information specifying the display position of the operation icon 151. The position information specifies the difference between the edited display position and a default position that is preset in the multifunction peripheral 10. The terminal program 65 displays numerical values inputted via the user interface 54 in the textboxes 114A and 115A. The numerical values initially displayed in the textboxes 114A and 115A are both "0".

The numerical value displayed in the textbox 114A indicates the difference between the display position and the default position in the left-right direction. Specifically, a positive number displayed in the textbox 114A indicates a position to the right of the default position, while a negative number in the textbox 114A indicates a position to the left of the default position. The textbox 115A indicates the difference between the display position and the default position in the vertical direction. Specifically, a positive number in the textbox 115A indicates a position above the default position, while a negative number in the textbox 115A indicates a position below the default position.

The pull-down menu 116A corresponds to an instruction for specifying a custom operation to be associated with the operation icon. The pull-down menu 116A accepts an input to specify one of a plurality of operation information records recorded in the operation information list. That is, the pull-down menu 116A includes selections corresponding to all of the operation information records registered in the operation information list. The pull-down menu 116A displays the operation name in the operation information record. In other words, the selection of one operation information by the user indicates selection of one operation ID and setting values of the operation identified by the one operation ID. The selections in the pull-down menu 116A are examples of operation information objects. In its initial state, the pull-down menu 116A specifies the standard operation defined by the content in the <FunctionID> element provided in the standard screen data.

In response to a specification for the [Background] tab 120 which is received via the user interface 54, the terminal program 65 displays the custom configuration screen shown in FIG. 9 on the display 53. This custom configuration screen includes textboxes 121 and 122, and a Search icon 123. The custom configuration screen shown in FIG. 9 enables the user to customize the title and background of the screen to be displayed on the display 23 of the multifunction peripheral 10. In other words, the custom configuration screen in FIG. 9 allows the user to customize parts of the screen displayed on the display 23 that are unrelated to the operation icons 151, 152, and 153.

The textbox 121 corresponds to an instruction to specify image data to be used as the background image. The terminal program 65 displays a data ID in the textbox 121 indicating the location of image data specified via the user interface 54. The background image is displayed over the entire display region of the display 23 and behind the operation icons 151, 152, and 153, i.e., in the background. In the initial state of the textbox 121, no image data is specified.

The textbox 122 corresponds to an instruction to modify the title of the screen displayed on the display 23. The terminal program 65 displays a character string inputted via the user interface 54 in the textbox 122. The character string initially displayed in the textbox 122 is "Standard Screen", which is the content of the <DisplayName> tag defined in the standard screen data.

The Search icon 123 corresponds to an instruction to specify image data to be used as the background image. In response to a specification for the Search icon 123 which is received via the user interface 54, the terminal program 65 displays on the display 53 a list of a plurality of sets of image data stored in the memory 62 or on a server (not shown) on the Internet, and receives via the user interface 54 a selection specifying one of the plurality of sets of image data. Next, the terminal program 65 displays the data ID for the specified set of image data in the textbox 121.

Figure 5B:
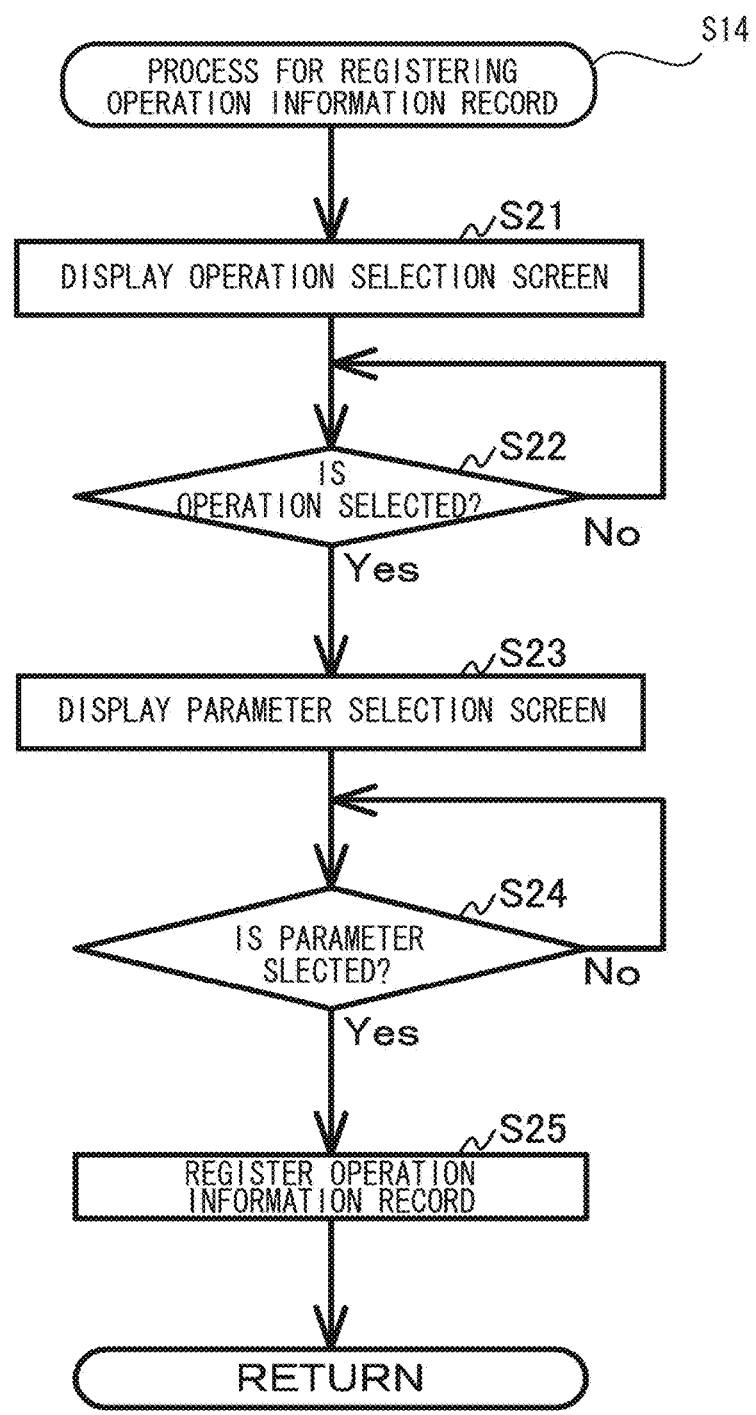
FIG. 5(B) is a flowchart illustrating a process for registering operation information record.

Further, in response to a specification for the [Register] icon 117 (FIG. 8) received via the user interface 54 (S13: registration), in S14 of FIG. 5 the terminal program 65 executes the process for registering operation information record. In the process for registering operation information record, the terminal program 65 receives various inputted information to be included in an operation information record via the user interface 54 and registers an operation information record containing the received information in the operation information list. Next, the process for registering operation information record will be described in greater detail with reference to FIG. 5(B).

Process for Registering Operation Information Record

Figure 10A:
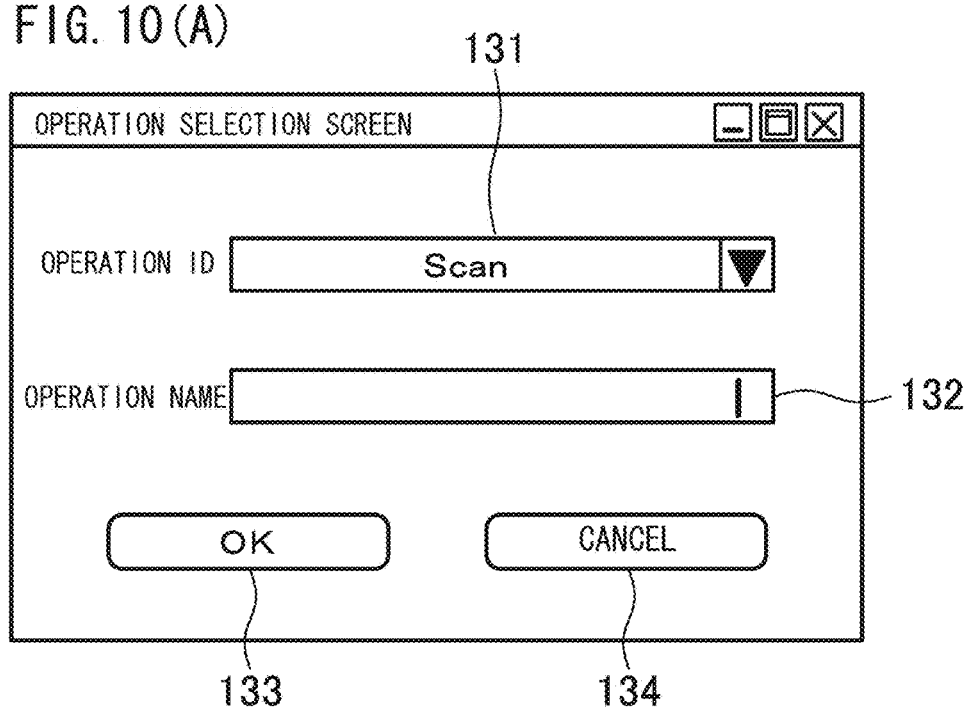
FIG. 10(A) is an explanatory diagram illustrating an example of an operation selection screen displayed on the display.

In S21 the terminal program 65 displays an operation selection screen shown in FIG. 10(A) on the display 53. The operation selection screen is an example of the second screen and prompts the user to select an operation ID and an operation name to be included in the operation information record. The operation selection screen includes a pull-down menu 131, a textbox 132, an [OK] icon 133, and a [Cancel] icon 134. In S22 the terminal program 65 receives inputs in the operation selection screen via the user interface 54. The process of S21 is an example of the second display process, and the process of S22 is an example of the second reception process.

The pull-down menu 131 is an object that allows the user to specify an operation ID to be included in the operation information record from among the plurality of operation IDs identifying operations that the designated device can implement. The pull-down menu 131 has selections corresponding to all of the operation IDs included in the device information. The selections in the pull-down menu 131 are examples of operation objects. In its initial state, the pull-down menu 131 indicates the operation ID "Scan". The textbox 132 corresponds to an instruction for specifying the operation name to be associated with the operation ID displayed on the pull-down menu 131. The terminal program 65 displays a character string inputted via the user interface 54 in the textbox 132 as the operation name.

In this example, the user selects the operation ID "Scan to FTP" from the options in the pull-down menu 131, inputs the operation name "Scan to Server" in the textbox 132, and selects the [OK] icon 133. Consequently, the terminal program 65 receives an input specifying the "Scan to FTP" operation ID, an input specifying the "Scan to Server" operation name, and a specification for the [OK] icon 133 via the user interface 54 (S22: YES) and temporarily stores the specified operation ID and the inputted operation name associated with each other in the memory 62.

Figure 10B:
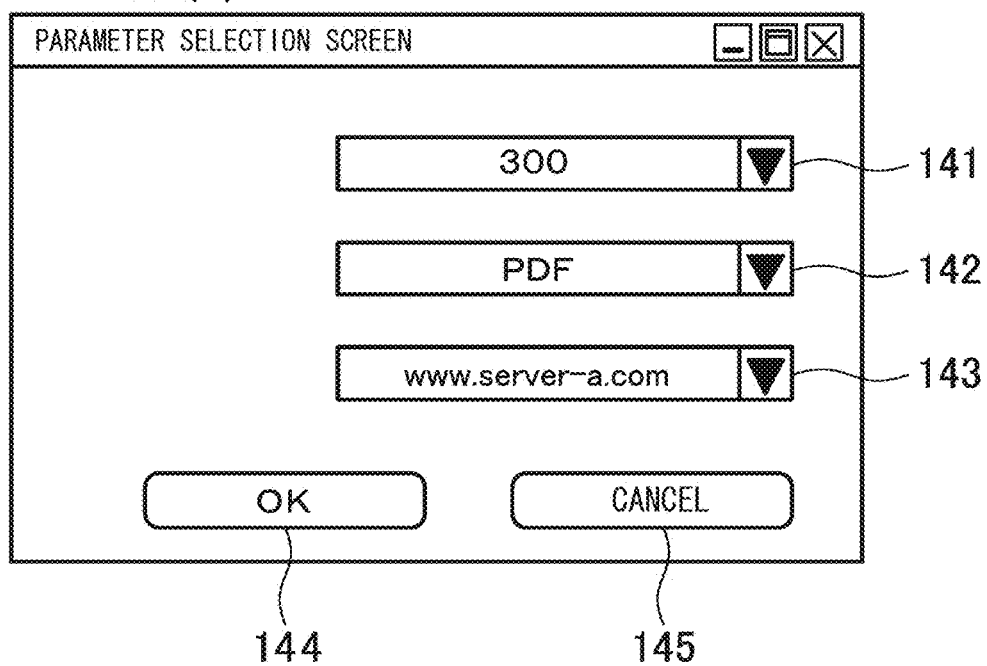
FIG. 10(B) is an explanatory diagram illustrating an example of a parameter selection screen displayed on the display.

In S23 the terminal program 65 displays a parameter selection screen shown in FIG. 10(B) on the display 53. The parameter selection screen is an example of the third screen and allows the user to select values of operation parameters for the scan-and-upload operation identified by the operation ID "Scan to FTP" that was selected in the operation selection screen. The parameter selection screen includes pull-down menus 141, 142, and 143, an [OK] icon 144, and a [Cancel] icon 145. In S24 the terminal program 65 receives inputs in the parameter selection screen via the user interface 54. The process of S23 is an example of the third displaying process, and the process of S24 is an example of the third receiving process.

The pull-down menus 141, 142, and 143 are objects that allow the user to specify values for operation parameters "resolution", "format", and "server ID" for the scan-and-upload operation. Each of the pull-down menus 141, 142, and 143 has selections corresponding to all possible candidate values that can be set as values for the corresponding one of parameters "resolution", "format", and "Server ID". The selections in the pull-down menus 141, 142, and 143 are examples of parameter objects. In their initial states, the pull-down menu 141 specifies the value "300 dpi"; the pull-down menu 142 specifies the value "PDF"; and the pull-down menu 143 specifies the value "www.server-a.com".

In this example, the user selects the value "300 dpi" from the selections in the pull-down menu 141, selects the value "PDF" from the selections in the pull-down menu 142, selects the value "www.server-a.com" from the selections in the pull-down menu 143, and specifies the [OK] icon 144. Consequently, the terminal program 65 receives inputs specifying the values "300 dpi", "PDF", and "www.server-a.com", and a specification for the [OK] icon 144 via the user interface 54 (S24: YES), and temporarily stores the specified values in the memory 62 as values of operation parameters for the operation ID selected in S22.

In S25 the terminal program 65 registers an operation information record that includes the operation ID and operation name temporarily stored in S22 and the operation parameters temporarily stored in S24 in the operation information list. Here, the values of operation parameters may be received in S23 and stored in association with the icon ID in S25. The process of S25 is an example of the storing process. On the other hand, in response to a specification received via the user interface 54 for the [Cancel] icon 134 in the operation selection screen, the terminal program 65 ends the process for registering operation information record without executing processes in S23-S25. Similarly, in response to a specification received via the user interface 54 for the [Cancel] icon 145 in the parameter selection screen, the terminal program 65 ends the process for registering operation information record without executing the process in S25.

Figure 11:
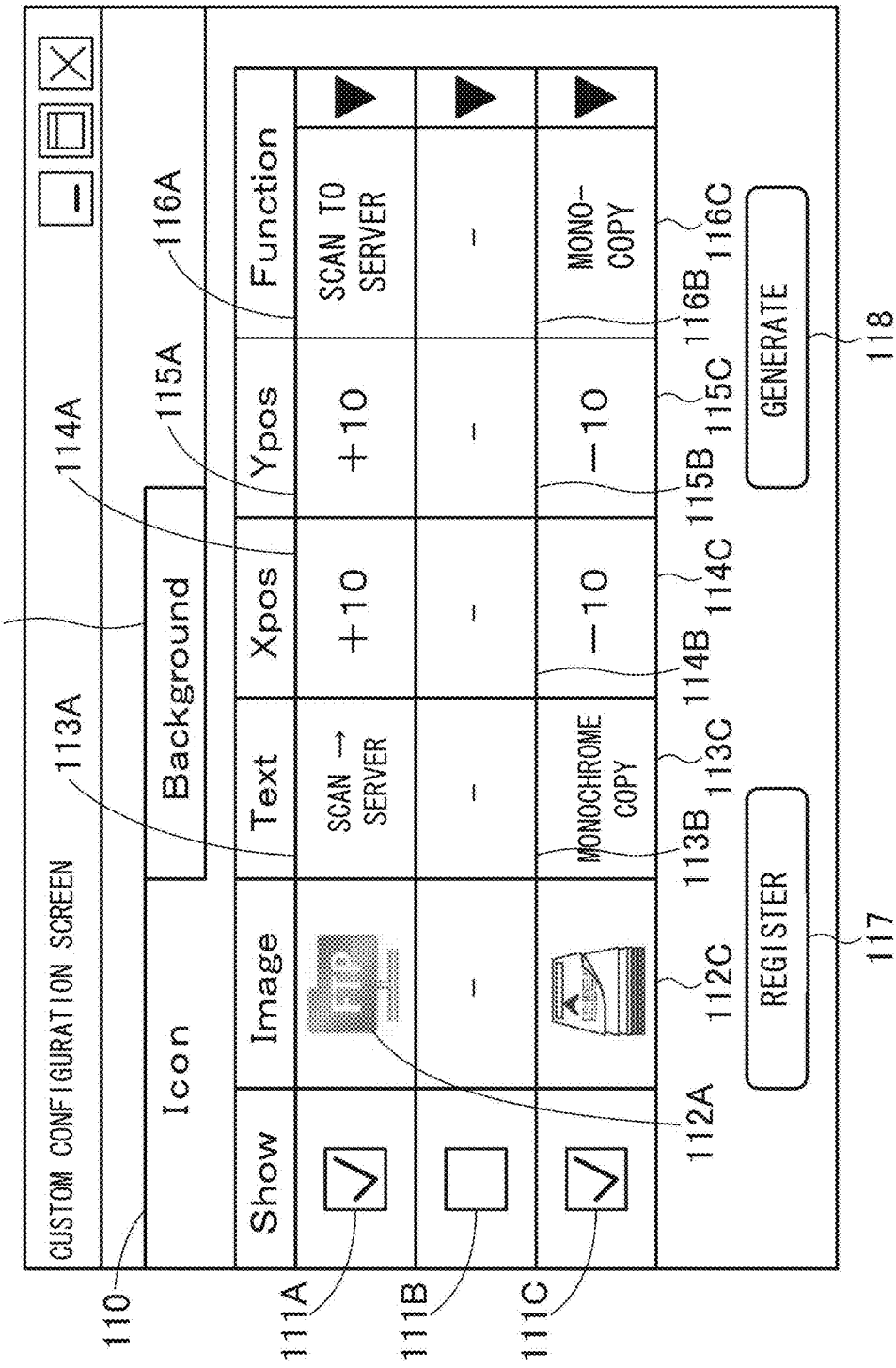
FIG. 11 is an explanatory diagram illustrating an example of a custom configuration screen displayed on the display after an input is received via a user interface in the information processing terminal.

Returning to FIG. 5(A), in response to an operation received via the user interface 54 for one of the objects 111-116 and 121-123 in the custom configuration screen (S13: Configuration change), then in S15 the terminal program 65 temporarily stores in the memory 62 information modified via the object and in S12 redisplays the custom configuration screen on the display 53 with the modified information. In this example, it will be assumed that the objects 111-116 in the custom configuration screen shown in FIG. 8 have been modified as illustrated in FIG. 11. It will also be assumed that the user specified the data ID "//custom/bgimage01.jpeg" in the textbox 121 and the screen title "Operation selection screen" in the textbox 122 through the custom configuration screen shown in FIG. 9.

In response to a specification received via the user interface 54 for the [Generate] icon 118 in the custom configuration screen (S13: Generation), in S16 the terminal program 65 executes the process for generating custom screen data. The process for generating custom screen data is performed to generate data using the various information that was specified through the custom configuration screen. The process for generating custom screen data will be described next in detail with reference to FIG. 6. In FIG. 6, steps S31-S36 are examples of processing steps, while step S37 is an example of the generating step.

Process for Generating Custom Screen Data

First, in S31-S34 the terminal program 65 converts the first image represented by the image data specified via the image icons 112A and 112C to icon images conforming to the first display condition stipulated for the operation icons 151 and 153. Since the same steps S31-S33 are performed for image data specified through both image icons 112A and 112C, the following description will focus on the process for image data specified through the image icon 112A.

The first display condition indicates the designated size of the operation icon 151, for example. The designated size stipulates the dimensions of the operation icon 151 to be displayed on the display 23 in both left-right and vertical directions. Further, the first display condition requires that the display state of the operation icon 151 on the display 23 varies between the display state prior to the user selecting the operation icon 151 via the user interface 24 and the display state after the user has selected the operation icon 151 via the user interface 24, for example.

Figure 13A:
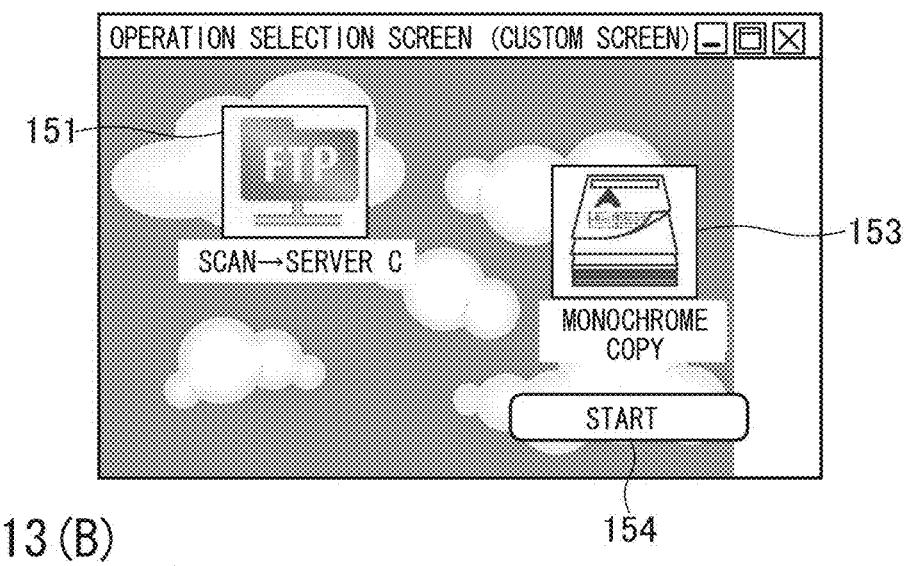
FIG. 13(A) is an explanatory diagram illustrating an example of a customized operation selection screen displayed on the display when an operation icon is selected.
Figure 13B:
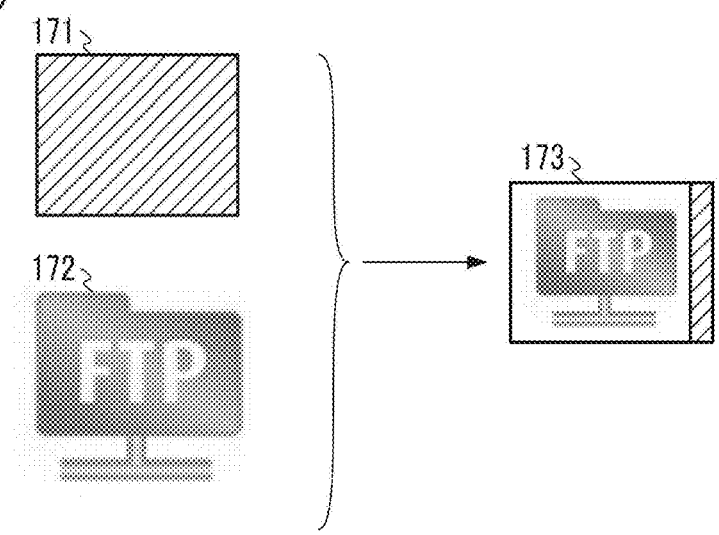
FIG. 13(B) is an explanatory diagram illustrating a method for converting an icon image.

As shown in FIG. 13(B), the terminal program 65 allocates a first memory area 171 in the memory 62 that has a capacity corresponding to the designated size specified by the first display condition. Specifically, the terminal program 65 allocates the first memory area 171 in the memory 62 having the capacity sufficient for developing the pixel values of all pixels constituting an image at the designated size. Next, in S31 the terminal program 65 sets the transparency for all pixels in the allocated first memory area 171 to 100%. In other words, the terminal program 65 sets the pixel values for all pixels in the allocated first memory area 171 to a transparent color (hereinafter, the pixels will be called "transparent pixels").

Next, in S32 the terminal program 65 acquires image data specified through the image icon 112A from the memory 62 or the server (not shown). The terminal program 65 enlarges or reduces the size of a first image 172 represented by the acquired image data while maintaining the aspect ratio of the first image 172 so that one of the left-right and vertical dimensions of the first image 172 conforms to a corresponding dimension defined by the designated size while the other dimension is less than a corresponding dimension defined by the designated size. The terminal program 65 develops the pixel values of the enlarged or reduced first image 172 in the first memory area 171 that was allocated in S31, as illustrated in FIG. 13(B).

Through these steps, a first icon image 173 is developed in the first memory area 171. The first icon image 173 is configured of the pixels constituting the enlarged or reduced first image 172 and the transparent pixels added around the outer edges of the enlarged or reduced first image 172. The first icon image 173 is an example of the first object image. The pixel values for each pixel constituting the first icon image 173 include a plurality of color values (R, G, and B values, for example) and the transparency (100%, for example).

Next, in S33 the terminal program 65 allocates a second memory area having the same capacity as the first memory area 171 in the memory 62. The terminal program 65 then copies the first icon image 173 from the first memory area 171 to the second memory area. The terminal program 65 generates a second icon image from the first icon image 173 developed in the second memory area. The second icon image is an example of the second object image having the same contours as the first icon image 173 but that differs in at least one of luminance, lightness, and chroma. That is, the first icon image 173 and the second icon image have substantially the same pattern, but differ in the shade of color.

More specifically, the terminal program 65 converts the pixel values of the first icon image 173 in the second memory area from values in the RGB color space to values in the Lab color space. In other words, the terminal program 65 converts pixel values for the first icon image 173 from a format expressed by a plurality of color values to a format expressed by a Lab color space having a dimension L for lightness and color-opponent dimensions a and b. Next, the terminal program 65 adjusts a pixel value of the dimension L for lightness in each pixel converted to the Lab color space according to a predetermined method. Subsequently, the terminal program 65 converts the pixel values for pixels with the adjusted value of the dimension L back to pixel values in the RGB color space, thereby developing the second icon image in the second memory area.

Note that the method of generating the second icon image is not limited to the example set forth above. As another example, the terminal program 65 may convert pixel values for the first icon image 173 in the second memory area from the RGB color space to the YCbCr color space. Subsequently, the terminal program 65 adjusts the luminance component Y for each pixel converted to the YCbCr color space according to a predetermined method. Thereafter, the terminal program 65 converts the pixel values with the adjusted luminance component Y back to the RGB color space, thereby developing the second icon image in the second memory area.

In S34 the terminal program 65 determines whether all icons have been generated. The terminal program 65 returns to S31 when there remain an icon to be generated (S34: NO). Once all icons have been generated (S34: YES), the terminal program 65 advances to S35.

In S35 and S36 the terminal program 65 converts a second image represented by the image data that was specified through the textboxes 121 and 123 (FIG. 9) to a background image conforming to the second display condition appropriate for the background of the image to be displayed on the display 23. The second display condition indicates the size of the display area in the display 23, for example. The display area size includes the left-right and vertical dimensions of a screen displayed on the display 23. The display area size is larger than the designated size. In other words, the first display condition and the second display condition are different from each other.

In S35 the terminal program 65 allocates a third memory area in the memory 62 that has a capacity corresponding to the display area size specified by the second display condition. Specifically, the terminal program 65 allocates in the memory 62 a third memory area having the capacity sufficient for developing the pixel values of all pixels constituting an image having the display area size. Next, the terminal program 65 sets all pixels in the allocated third memory area to default pixel values. The default pixel values are pixel values for a color that has been preset as the background color of the image to be displayed on the display 23 (white or black, for example).

Next, in S36 the terminal program 65 acquires image data specified through the textbox 121 and the Search icon 123 from the memory 62 or the server (not shown). The terminal program 65 then enlarges or reduces the second image represented by the acquired image data while maintaining the aspect ratio of the second image so that one of the left-right and vertical dimensions of the second image is equivalent to a corresponding dimension defined by the display area size, while the other dimension is less than a corresponding dimension defined by the display area size. Next the terminal program 65 develops the pixel values for the enlarged or reduced second image in the third memory area allocated in S35. Through this process, the terminal program 65 develops a background image in the third memory area that is configured of pixels constituting the enlarged or reduced second image, and pixels with the default pixel values that are added around the outer edges of the enlarged or reduced second image.

In S37 the terminal program 65 generates the custom screen data shown in FIG. 3(B) based on the various information that the user specified in the custom configuration screen. The custom screen data represents a custom screen that has been customized by the user via the custom configuration screen. The data structure of the custom screen data is roughly the same as the standard screen data. The following description of the custom screen data omits details of points shared with the standard screen data and focuses on the differences.

The terminal program 65 sets the character string specified via the textbox 122 as an element defined by the <DisplayName> tag in the custom screen data. The terminal program 65 sets the data ID for image data representing the background image developed in the third memory area as the element defined in a <BGImage> tag in the custom screen data. The terminal program 65 also sets the information specified through objects 111A-116A, 111B-116B, and 111C-116C as elements of icon tags that include the corresponding icon IDs "001", "002", and "003" in the custom screen data.

The <IconID> and <FunctionID> elements are the same in both the standard screen data and the custom screen data. Further, the terminal program 65 sets the data ID for image data representing the first icon image 173 that was developed in the first memory area 171 as the element defined in the <Normal> tag in the custom screen data. The terminal program 65 also sets the data ID for image data representing the second icon image that was developed in the second memory area as the element defined in the <Pushed> tag in the custom screen data. The terminal program 65 also sets the character string specified through the textbox 113A (FIG. 8) as the element defined in the <IconText> tag in the custom screen data. The <Icon> elements in the custom screen data further include elements with the tags <ViewState>, <ChangePosX>, and <ChangePosY>.

The <ViewState> elements correspond to the states of the checkboxes 111A-111C (FIG. 8). That is, the terminal program 65 sets the content of the <ViewState> tags associated with the checked checkboxes 111A and 111C to "1" and sets the content of the <ViewState> tag associated with the unchecked checkbox 111B to "0". The content of the <ChangePosX> tags corresponds to the numbers displayed in the textboxes 114A-114C (FIG. 8), and the content of the <ChangePosY> tags corresponds to the numbers displayed in the textboxes 115A-115C (FIG. 8).

The terminal program 65 temporarily stores the custom screen data generated in S37 in the memory 62 in association with the image data representing the first icon image 173 stored in the first memory area 171, the image data representing the second icon image stored in the second memory area, and the image data representing the background image stored in the third memory area.

Returning to FIG. 5(A), in S17 the terminal program 65 generates the custom operation data shown in FIGS. 4(A) and 4(B) on the basis of the operation information record selected through the pull-down menus 116A and 116C (FIG. 8). In S18 the terminal program 65 generates an instruction script shown in FIG. 4(C). The terminal program 65 temporarily stores the custom operation data and instruction script in the memory 62 in association with the custom screen data temporarily stored in S37. Steps S17 and S18 are an example of the generating process.

The custom operation data specifies custom operations indicated in operation information records selected through the pull-down menus 116A and 116C (FIG. 8). In other words, the custom operation data makes it possible to execute an operation specified by an operation ID included in the specified operation information record according to operation parameters included in the operation information record. Since each set of custom operation data has the same structure, the custom operation data shown in FIG. 4(A) will be described as an example.

That is, first, the terminal program 65 sets the content of the <FunctionID> tag to the function ID "901", which does not duplicate a function ID in the standard operation data. The terminal program 65 also sets a <Scan to FTP> tag as an element in a <Customize Function> tag. The <Scan to FTP> tag specifies (or, is based on) the operation ID in the operation information record represented by the operation name "Scan to Server". The terminal program 65 also sets operation parameters in the operation information record as the content of the <Scan to FTP> tag. Specifically, the terminal program 65 sets the content of a <Resolution> element to the value "300 dpi" as the resolution parameter, sets the content of a <FileType> element to the value "PDF" as the format parameter, and sets the content of a "DestinationID> element to the value "www.server-a.com" as the server ID parameter.

The instruction script is an example of the instruction data that controls the multifunction peripheral 10 to execute custom operations associated with the operation icons 151 and 153 described in <Icon> tags in the custom screen data when the user selects the operation icons 151 and 153. The instruction script shown in FIG. 4(C) serves to implement the custom operation specified in the custom operation data shown in FIG. 4(A) when the user selects the operation icon 151 identified by the icon ID "001". The same instruction script shown in FIG. 4(C) implements the custom operation specified in the custom operation data shown in FIG. 4(B) when the user selects the operation icon 153 identified by the icon ID "003".

More specifically, the instruction script specifies a function convert_appui. The function convert_appui acquires an argument in_funcID from the calling program, and supplies a return value out_funcID to the calling program. Here, the function convert_appui returns the value "901" as the return value out_funcID when the argument in_funcID is "001", returns the value "903" as the return value out_funcID when the argument in_funcID is "003", and supplies the argument in_funcID as the return value out_funcID in all other cases. In other words, the instruction script associates icon ID with custom operation data which is identified by the function ID. Because the content of <ViewState> tag is set to "0" for the icon ID "002", no custom operation data is assigned with the icon ID "002". That is, returning the argument in_funcID indicates that no operation data is assigned with the icon ID identified by the argument in_funcID.

In S19 the terminal program 65 outputs the custom screen data and image data temporarily stored in S37, the custom operation data temporarily stored in S17, and the instruction data (instruction script) temporarily stored in S18 (hereinafter collectively referred to as the "custom instruction data"). Specifically, the terminal program 65 outputs the custom instruction data directly or indirectly to the designated device. Step S19 is an example of the output process.

As an example of outputting custom instruction data directly, the terminal program 65 may transmit the custom instruction data to the designated device through the communication interface 55. As an example of outputting custom instruction data indirectly, the terminal program 65 may issue a notification to the output program (not shown) installed on the information processing terminal 50 with a pointer specifying the top address of the memory area (for example, the memory 62) in which the custom instruction data is stored. Subsequently, the output program may read the custom instruction data from the memory area specified by the pointer in the notification received from the terminal program 65, and may transmit the custom instruction data to the designated device via the communication interface 55.

In the meantime, the device program 35 in the multifunction peripheral 10 serving as the designated device receives the custom instruction data from the information processing terminal 50 via the communication interface 25. This process is an example of the reception process. The device program 35 then stores the custom instruction data in the memory 32 separate from the standard screen data and standard operation data. The device program 35 also executes a main process each time the power to the multifunction peripheral 10 is turned on, for example. This main process will be described next in detail with reference to FIG. 7.

Main Process

In S41 the device program 35 determines whether custom screen data is stored in the memory 32. If the device program 35 determines that no custom screen data has been stored in the memory 32 (S41: NO), in S42 the device program 35 reads the standard screen data shown in FIG. 2(A) from the memory 32. Further, in S42 the device program 35 displays the standard screen shown in FIG. 12(A) on the display 23 on the basis of this standard screen data. As shown in FIG. 12(A), the standard screen includes the operation icons 151, 152, and 153, and a [Start] icon 154. In S44 the device program 35 receives inputs in the standard screen via the user interface 24. The process of S42 is an example of the displaying process. The process of S44 is an example of the second receiving process.

More specifically, the device program 35 reads image data from the memory 32 that is identified by the data ID "//standard/standard_Icon01_normal.jpeg" provided as the content in the <Normal> tag. Next, the device program 35 displays an image represented by the image data read from the memory 32 at the default position in the standard screen as the operation icon 151 identified by the icon ID "001". In response to reception of a specification for the operation icon 151 via the user interface 24, the device program 35 switches the image data representing the image displayed as the operation icon 151 from the image data identified by the data ID in the <Normal> element to image data identified by the data ID in the <Pushed> element. This process is identical for the operation icons 152 and 153.

Further, in response to receiving a specification for the [Start] icon 154 via the user interface 24 while the operation icon 151 in FIG. 12(A) has been selected (S44: YES), the device program 35 reads from the standard screen data the function ID "001", which is the content of the <FunctionID> tag corresponding to the selected operation icon 151. In S45 the device program 35 determines whether instruction script has been stored in the memory 32.

In S45 the device program 35 determines whether the instruction script is stored in the memory 32. In response to determination of that the instruction script has not been stored in the memory 32 (S45: NO), the device program 35 reads from the memory 32 standard operation data that includes the function ID "001" in the <FunctionID> element (FIG. 2(B)). In S48 the device program 35 instructs the multifunction peripheral 10 to execute the standard operation specified by the standard operation data read from the memory 32. That is, the device program 35 controls the scanner 12 to execute the scan operation according to the standard operation data specified in FIG. 2(B) in order to read an original at the resolution "300 dpi" to generate scan data in the file format "PDF". The process of S48 is an example of the execution process.

On the other hand, in response to determination of that custom screen data has been stored in the memory 32 (S41: YES), the device program 35 reads the custom screen data shown in FIG. 3(B) from the memory 32. In S43 the device program 35 displays the custom screen shown in FIG. 12(B) on the display 23 on the basis of the custom screen data read from the memory 32. The custom screen includes the screen title "Operation selection screen", the background image, the operation icons 151 and 153, and the [Start] icon 154. The following description will focus on differences from display of the standard screen while omitting a detailed description of the common points. The process of S43 is an example of the display process.

Specifically, the device program 35 displays the character string "Operation selection screen" defined in the <DisplayName> element as the screen title for the custom screen. The device program 35 also reads from the memory 32 image data identified by the data ID "//custom/bgimage01.jpeg" defined in the <BGImage> element. As the background image, the device program 35 displays the image represented by the image data read from the memory 32. The background image covers the entire display region of the display 23 and is displayed behind the operation icons 151 and 153.

Figure 12B:
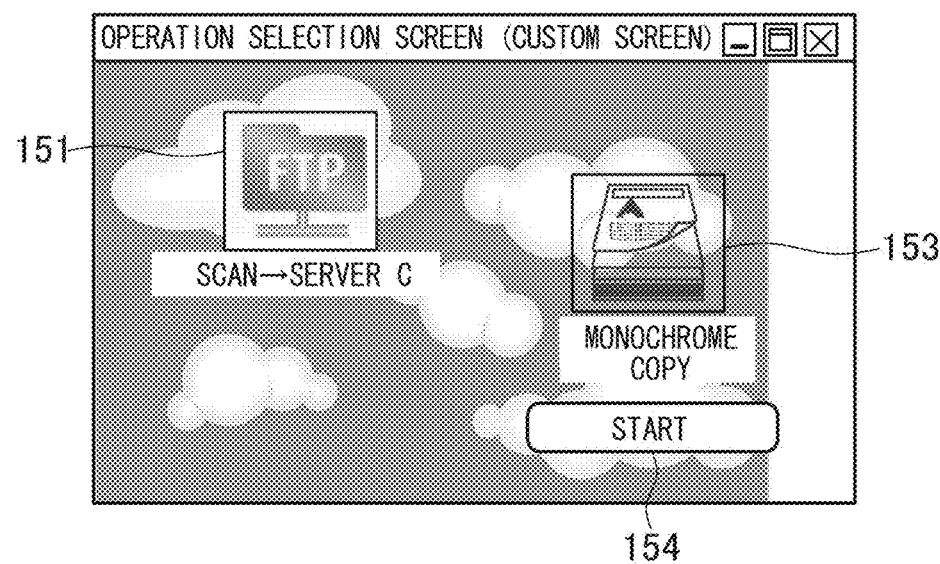
FIG. 12(B) is an explanatory diagram illustrating an example of a customized operation selection screen displayed on the display.

The device program 35 also reads from the memory 32 image data identified by the data ID "//custom/custom_icon01_normal.jpeg" defined in the <Normal> element. The device program 35 displays the image represented by the image data read from the memory 32 as the operation icon 151 identified by the icon ID "001" at the position identified by the <ChangePosX> and <ChangePosY> elements. In other words, the operation icon 151 shown in FIG. 12(B) is displayed at a position shifted upward and rightward from the operation icon 151 displayed at the default position in FIG. 12(A). The operation icon 153 is similarly displayed. However, since the content of the <ViewState> tag is set to "0" for the operation icon 152, the device program 35 does not display the operation icon 152 in the custom screen.

Next, the device program 35 receives a specification for the operation icon 153, for example, via the user interface 24. In response to this specification, the device program 35 switches the image data representing the image displayed as the operation icon 153 from the image data identified by the data ID defined in the <Normal> element to the image data identified by the data ID defined in the <Pushed> element. In other words, the device program 35 displays the operation icon 153 with the same pattern but a different color shade after the operation icon 153 is selected via the user interface 24, as illustrated in FIGS. 12(B) and 13(A).

For example, in response to receiving a specification for the [Start] icon 154 via the user interface 24 while the operation icon 151 has been selected (S44: YES), the device program 35 reads the function ID "001" defined in the <FunctionID> element corresponding to the selected operation icon 151 from the custom screen data. Further, in response to determining that an instruction script is stored in the memory 32 (S45: YES), the device program 35 reads the instruction script shown in FIG. 4(C) from the memory 32 using the function ID "001" as the argument in_funcID. By setting the argument in_funcID to the function ID "001" identifying the standard operation data, the instruction script supplies the function ID "901" identifying custom operation data to the device program 35 as the return value out_funcID.

In S46 the device program 35 determines whether the return value out-_funcID specifies a custom operation or a standard operation. Since the return value out_funcID is set to the function ID "901" indicating custom operation data in this case (S46: Custom), the device program 35 reads custom operation data including the function ID "901" in the <FunctionID> element from the memory 32. In S47 the device program 35 controls the multifunction peripheral 10 to execute the custom operation specified in the custom operation data. Specifically, the device program 35 controls the scanner 12 on the basis of the custom operation data shown in FIG. 4(A) to read an original at the resolution "300 dpi" in order to generate scan data in the file format "PDF", and controls the communication interface 25 to implement an upload operation for transmitting the scan data to the server identified by server ID "www.server-a.com". The process of S47 is an example of the execution process.

On the other hand, in response to acquisition of a return value out_funcID from the instruction script that is assigned to a function ID for standard operation data (S46: Standard), in S48 the device program 35 reads standard operation data identified by the function ID from the memory 32. Further, in S48 the device program 35 controls the multifunction peripheral 10 to execute the standard operation specified by the standard operation data.

Operations and Effects of the Embodiment

According to the embodiment described above, the user can change an operation, which is implemented on the multifunction peripheral 10 in response to selection of one of the relevant operation icon 151, 152, or 153 displayed on the display 23, from a standard operation to a custom operation. The multifunction peripheral 10 can be controlled to implement the custom operation according to values of operation parameters specified by the user. This enables the user to flexibly customize the user interface of the multifunction peripheral 10 to suit the preferred mode of use.

Further, the embodiment described above can simplify inputs for specifying an operation ID and values of operation parameters by prompting the user to specify one of a plurality of operation information records. Through the process of the embodiment for registering operation information records, the user can preregister desired sets of operation IDs and values of operation parameters as operation information records. This procedure can simplify the inputs for specifying combinations of desired operation IDs and values of operation parameters.

Further, since the user can include conditions for executing each operation of a compound operation in an operation information record, the embodiment can simplify the inputs for specifying operation IDs and values of operation parameters. Note that the method of customizing each type of information through the custom configuration screen is not limited to the example in the embodiment. For example, the terminal program 65 may prompt the user to specify the operation ID and values of operation parameters separately through the custom configuration screen.

In the embodiment described above, the user is prompted to specify image data that will be used as the operation icons 151 and 153, and the terminal program 65 processes the first image represented by the specified image data to conform with the first display condition. In other words, the user can display object images that plainly represent the corresponding operations on the display 23 as the operation icons 151 and 153, thereby flexibly customizing the user interface of the multifunction peripheral 10.

For example, the terminal program 65 may enlarge or reduce the first image to a size smaller than the designated size while maintaining the aspect ratio, and can fit the image to the designated size by adding transparent pixels around the outer edges of the enlarged or reduced first image. In this way, the user can specify desired image data without worrying about the designated size of the operation icons 151 and 153. Further, by only prompting the user to specify a desired set of image data, the terminal program 64 can vary the display mode for the corresponding operation icon 151 or 153 to be different after the icon is selected. Hence, the user can easily and flexibly customize the user interface on the multifunction peripheral 10.

In the embodiment described above, the user can display a desired background image on the display 23. In addition, when the user specifies an image to be used as the object image, the terminal program 65 resizes the image suitable for the object image. Further, when the user specifies an image to be used as the background image, the terminal program 65 resizes the image suitable for the background image. Accordingly, the terminal program 65 can automatically resize the images depending on the respective purposes, thereby improving usability. Further, since the terminal program 65 converts the user-specified images to a size suitable for the object image and background image, the user can select desired image data without worrying about the size of the image. Hence, the user can more flexibly customize the user interface of the multifunction peripheral 10.

Further, if the enlarged or reduced first image is smaller than the designated size, the device program 65 can replace a portion of the object image displayed on the display 23 with pixels of the background image, thereby displaying a natural object image on the display 23 that maintains the aspect ratio of the first image. Further, when the enlarged or reduced second image is smaller than the display area size, the device program 35 can display a background image on the display 23 that includes pixels of a preset color, thereby displaying a natural background image on the display 23 that maintains the aspect ratio of the second image.

Further, in the embodiment the user can instruct the multifunction peripheral 10 to display the operation icons 151 and 153 at desired display positions. In addition, the user can designate only the operation icons 151 and 153 among the operation icons 151, 152, and 153 to be displayed on the display 23 in the initial state so that the operation icon 152 is hidden. Further, the user can display character strings together with the operation icons 151 and 153 that plainly represent the corresponding operations. In addition, the user can display a character string that plainly describes the custom screen. In other words, the embodiment allows the user to more flexibly customize the user interface on the multifunction peripheral 10.

While the embodiment describes an example of customizing what may be called the top screen that is initially displayed when the power for the multifunction peripheral 10 is turned on, the customizable screens are not limited to the top screen, but may include any screen displayed on the display 23 of the multifunction peripheral 10. Note that the "initially displayed screen" does not include what is sometimes referred to as a splash screen displaying the manufacturer's logo, or screens asking the user to agree to terms and conditions, for example.

In the multifunction peripheral 10 and information processing terminal 50 of the embodiment described above, the corresponding CPUs 31 and 61 execute the programs stored in the corresponding storage units 32 and 62 as an example of the control devices of the present disclosure implementing processes. However, the configuration of the control devices is not limited to this example. All or part of the control device configuration may be implemented in hardware, such as integrated circuits. Further, at least part of each control device may be achieved by a CPU, a plurality of CPUs, an Application Specific Integrated Circuit (ASIC), a plurality of ASICs, or any combination of these devices.

Further, the present invention is not limited to an implementation using the multifunction peripheral 10 and the information processing terminal 50, but may be implemented as a program that controls the multifunction peripheral 10 and the information processing terminal 50 to execute processes. Further, this program may be recorded on a non-transitory recording medium to be supplied to the user. The non-transitory recording media may include a CD-ROM, a DVD-ROM, or a storage provided in a server that can connect to the multifunction peripheral 10 and the information processing terminal 50 via a communication network. The program stored in the storage of the server may be distributed over a communication network, such as the Internet, as information or signals specifying the program.

While the disclosure has been described in detail with reference to the above embodiments, it would be apparent to those skilled in the art that various changes and modifications may be made thereto.

What is claimed is:

1. A non-transitory computer readable storage medium storing a set of instructions installed on and executed by an information processing terminal having a terminal display and a user interface, the set of instructions comprising:

acquiring a plurality of object IDs identifying respective ones of a plurality of display objects, the plurality of display objects being to be displayed at respective designated positions on an apparatus display of an image forming apparatus, each of the plurality of object IDs being previously associated with a corresponding standard operation concerning one of a plurality of operations which the image forming apparatus is capable of execute;

acquiring a plurality of operation IDs identifying respective ones of the plurality of operations;

receiving a first input indicating an operation ID to be associated to a specific object ID via the user interface, the indicated operation ID being one of the plurality of operation IDs, the specific object ID being one of the plurality of object IDs and previously associated with a specific standard operation;

generating instruction data and custom operation data so that the specific object ID is associated with the indicated operation ID, the custom operation data defining a custom operation concerning an operation identified by the indicated operation ID, the instruction data being information used for execution of the custom operation defined by the custom operation data instead of executing the specific standard operation in response to designation of a display object identified by the specific object ID; and outputting the generated custom operation data and the generated instruction data.

2. The non-transitory computer readable storage medium according to claim 1, wherein the set of instructions further comprises acquiring values to be set for a plurality of operation parameters, each of the values indicating a condition of the custom operation, wherein the receiving further receives, associated with the specific object ID, a second input designating a value of an operation parameter via the user interface from among the acquired values, wherein the generating generates the custom operation data defining the custom operation according to the received value of the operation parameter.

3. The non-transitory computer readable storage medium according to claim 2, wherein the information processing terminal further includes a memory storing a plurality of sets of operation information, each of the plurality of sets of operation information including an operation ID and a value of an operation parameter,
  wherein the set of instructions includes displaying a first screen on the terminal display to prompt to select via the user interface, from among the plurality of acquired operation IDs, the operation ID to be associated with the specific object ID;
  wherein the first screen includes a plurality of operation information objects corresponding to respective ones of the plurality of sets of operation information,
  wherein the receiving a first input and the receiving a second input are achieved by receiving via the user interface an input indicating an operation information object which corresponds to a set of operation information including the indicated object ID and the received value of the operation parameter from among the plurality of operation information objects,
  wherein the generating generates the custom operation data defining the custom operation so that the operation identified by the indicated operation ID, which is included in the set of operation information corresponding to the indicated operation information object, is executed according to the received value included in the set of operation information corresponding to the indicated operation information object.

4. The non-transitory computer readable storage medium according to claim 3, wherein the set of instructions further comprises:
  displaying on the terminal display a second screen including a plurality of operation objects corresponding to respective ones of the plurality of operation IDs;
  receiving via the user interface a third input designating an operation object among the plurality of operation objects displayed on the second screen;
  displaying a third screen including a plurality of parameter objects corresponding to respective ones of the plurality of operation parameters on the terminal display;
  receiving via the user interface a fourth input designating a value of an operation parameter through the corresponding parameter object displayed on the third screen; and
  storing, in the memory as a set of operation information, the operation ID corresponding to the designated operation object and the designated value of the operation parameter,
  wherein prior to executing displaying the first screen, executed are the displaying a second screen, the receiving via the user interface a third input, the displaying a third screen, the receiving a fourth input, and the storing.

5. The non-transitory computer readable storage medium according to claim 2, wherein the custom operation is a combination of a first operation and a second operation, the first operation being performed by a first operation machine included in the image forming apparatus, the second operation being performed by a second operation machine included in the image forming apparatus,
  wherein the set of instructions further comprises receiving via the user interface a fifth input designating a value of a first operation parameter indicating an execution condition of the first operation and a value of a second operation parameter indicating an execution condition of the second operation.

6. The non-transitory computer readable storage medium according to claim 2, wherein the information processing terminal further includes a memory storing the plurality of object IDs, the plurality of operation IDs, and the values to be set for the plurality of operation parameters,
  wherein the acquiring a plurality of object IDs reads the plurality of object IDs from the memory, the acquiring a plurality of operation IDs reads the plurality of operation IDs from the memory, the acquiring values to be set for a plurality of operation parameters reads the values to be set for the plurality of operation parameters from the memory.

7. The non-transitory computer readable storage medium according to claim 2, wherein the information processing terminal further has a communication interface,
  wherein the acquiring a plurality of object IDs receives the plurality of object IDs via the communication interface, the acquiring a plurality of operation IDs receives the plurality of operation IDs via the communication interface, and the acquiring values to be set for a plurality of operation parameters receives the values to be set for the plurality of operation parameters via the communication interface.

8. The non-transitory computer readable storage medium according to claim 1, wherein the set of instructions further comprises:
  receiving via the user interface a sixth input designating image data associated with the specific object ID; and
  generating custom screen data allowing the apparatus display to display an image represented by the designated image data as a display object identified by the specific object ID,
  wherein the outputting further outputs the generated custom screen data.

9. The non-transitory computer readable storage medium according to claim 1, wherein in response to acquiring the plurality of object IDs and receiving the first input, the specific object ID is associated with the indicated operation ID which identifies the operation concerning the custom operation that is different from the specific standard operation.

10. A system comprising:
  an information processing terminal having a terminal display, a first user interface, and a first control device; and
  an image forming apparatus having an apparatus display, a second user interface, a communication interface, and a second control device,
  wherein the first control device is configured to:
  acquire a plurality of object IDs identifying respective ones of a plurality of display objects, the plurality of display objects being to be displayed at respective designated positions on the apparatus display of the image forming apparatus, each of the plurality of object IDs being previously associated with a corresponding standard operation concerning one of a plurality of operations which the image forming apparatus is capable of execute;
  acquire a plurality of operation IDs identifying respective ones of the plurality of operations;
  receive a first user input indicating an operation ID to be associated to a specific object ID via the first user interface, the indicated operation ID being one of the plurality of operation IDs, the specific object ID being one of the plurality of object IDs and previously associated with a specific standard operation;
  generate instruction data and custom operation data so that the specific object ID is associated with the indicated operation ID, the custom operation data defining a custom operation concerning an operation identified by the indicated operation ID, the instruction data being information used for execution of the custom operation defined by the custom operation data instead of executing the specific standard operation in response to designation of a display object identified by the specific object ID; and output the generated custom operation data and the generated instruction data to the image forming apparatus, wherein the second control device is configured to:

receive the custom operation data and the instruction data from the information processing terminal via the communication interface;

display the display objet identified by the specific object ID at the designated position of the apparatus display;

receive a second input indicating the display object displayed on the apparatus display via the second user interface;

execute the custom operation defined by the custom operation data concerning the operation identified by the indicated operation ID in response to reception of the second input.

* * * * *